US 008549503B2

(12) United States Patent
Gupta (10) Patent No.: US 8,549,503 B2
(45) Date of Patent: *Oct. 1, 2013

(54) DETECTING DANGLING POINTERS AND MEMORY LEAKS WITHIN SOFTWARE (75) Inventor: Satish Chandra Gupta, Kerala (IN)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/448,988

(22) Filed: Apr. 17, 2012

(65) Prior Publication Data
US 2012/0204165 A1 Aug. 9, 2012

Related U.S. Application Data (63) Continuation of application No. 11/754,737, filed on May 29, 2007, now Pat. No. 8,245,209.

(51) Int. Cl.
G06F 9/45 (2006.01)

(52) U.S. Cl.
USPC ............................ 717/151; 717/153; 717/159

(58) Field of Classification Search
None
See application file for complete search history.

(56) References Cited

U.S. PATENT DOCUMENTS

| 5,590,329 | A  | * | 12/1996 | Goodnow et al. | 717/144 |
| 5,953,530 | A  | * | 9/1999  | Rishi et al.   | 717/127 |
| 6,125,434 | A  | * | 9/2000  | Willard et al. | 711/170 |
| 6,560,773 | B1 |   | 5/2003  | Alexander, III et al. | |
| 6,658,652 | B1 |   | 12/2003 | Alexander, III et al. | |
| 6,874,074 | B1 | * | 3/2005  | Burton et al.  | 711/170 |
| 7,403,961 | B1 |   | 7/2008  | Deepak et al.  | |
| 7,487,321 | B2 | * | 2/2009  | Muthiah et al. | 711/170 |
| 8,291,379 | B2 | * | 10/2012 | Krauss et al.  | 717/121 |
| 2003/0110470 | A1 | * | 6/2003  | Hanson et al. | 717/114 |
| 2005/0235127 | A1 |   | 10/2005 | Muthiah et al. | |
| 2006/0265694 | A1 | * | 11/2006 | Chilimbi et al. | 717/124 |
| 2008/0209404 | A1 | * | 8/2008  | Brady | 717/128 |

OTHER PUBLICATIONS

Valgrind User Manual, Copyright © 2000-2012 Valgrind™ Developers, retrieved from http://valgrind.org/docs/manual/mc-manual.html.*
Gupta et al., "Navigating "C" in a "leaky" boat? Try Purify," IBM, Aug. 22, 2006.*
Insure++ User's Guide—Insure++, Parasoft, © 1996-2000.*
Heine et al., "A Practical Flow-Sensitive and Context-Sensitive C and C++ Memory Leak Detector," Copyright 2003 ACM.*

(Continued)

Primary Examiner — Insun Kang
(74) Attorney, Agent, or Firm — Hamilton, Brook, Smith & Reynolds P.C.

(57) ABSTRACT

Dangling pointers and memory leak locations within software are detected. As the software allocates and deallocates memory, lists of pointers referencing the memory, and pointer status, are maintained. As the software writes new addresses within pointers and reads addresses referenced by the pointers, the pointer lists are maintained to determine whether the pointers are dangling and to detect memory leak locations. A balanced binary tree having a number of nodes can be maintained. The nodes represent heap or stack records. Each heap record corresponds to heap memory that has been allocated and has a list of pointers referencing the heap memory. Each stack record corresponds to a stack within which a stack frame is allocated each time a function is entered. The stack record has frame records corresponding to the stack frames. Each frame record has a list of pointers referencing the corresponding stack frame.

14 Claims, 5 Drawing Sheets

(56) References Cited

OTHER PUBLICATIONS

Comparing and contrasting the runtime error detection technologies used in HeapAgent™ 3.0, Purify NT® 4.0, and BoundsChecker Pro™ 4.0, Copyright © 1996-1997 MicroQuill Software Publishing, Inc.*

Rational® PurifyPlus Rational® Purify® Rational® PureCoverage® Rational® Quantify®, Rational Software Corporation, May 20, 2002.*

Begic, "An introduction to runtime analysis with Rational PurifyPlus," IBM, Nov. 19, 2003, retrieved from http://www.ibm.com/developerworks/rational/library/957.html.*

Purify User's Guide, Rational Software Corporation, copyright 1992-1997.*

Garbervetsky, D., et al., "Program Instrumentation and Run-Time Analysis of Scoped Memory in Java," Electronic Notes in Theoretical Computer Science, 2004.

Higuera-Toledano, M.T., "Hardware-Based Solution Detecting Illegal References in Real-Time Java," Procs. of 15$^{th}$ Euromicro Conf. On Real-Time Systems, 2003.

Oiwa, Y., et al., "Fail-Safe ANSI-C Compile: An Approach to Making C Programs Secure," Mext-NSF-JSPS Int'l Symp., 2003.

Xu, W., et al., "An Efficient and Backwards-Compatible Transformation to Ensure Memory Safety of C Programs," SIGSOFT'04, Oct. 31-Nov. 6, 2004, Newport Beach, CA.

Yong, S.H., et al., "Protecting C Programs from Attacks Via Invalid Pointer Dereferences," ESEC/FSE'03, Sep. 1-5, 2003, Helsinki, Finland.

Shaw, K., "Diagnosis of Dynamic Errors in Computer Programs Only Appearing in Realtime Operation," *Elektronik Praxis* No. 17, pp. 142-145 (2000).

* cited by examiner

FIG 1A

```
1     int *ptr=NULL;
2
3     void main() {
4          foo();
5          *ptr = 20;
6          bar();
7     }
8
9     void foo() {
10         int i=10;
11         ptr = &i;
12    }
13
14    void bar() {
15         int j=30;
16         *ptr = 40;
17    }
```
100

FIG 1B

```
1     int *pi;
2
3     void foo() {
4          pi = new int [8];
5          /* use pi */
6          delete[] pi;
7     }
8
9     void main {
10         pi = new int[4];
11         foo();
12         pi[0] = 10;
13    }
```
150

DETECTING DANGLING POINTERS AND MEMORY LEAKS WITHIN SOFTWARE

RELATED APPLICATION(S)

This application is a continuation of U.S. application Ser. No. 11/754,737, filed May 29, 2007, now U.S. Pat. No. 8,245,209, issued on Aug. 14, 2012. The entire teachings of the above application(s) are incorporated herein by reference.

FIELD OF THE INVENTION

The present invention relates generally to software that at runtime may have dangling pointers and memory leaks, and more particularly to detecting such dangling pointers and memory leak locations at runtime of the software.

BACKGROUND OF THE INVENTION

Inappropriate memory usage is an intractable class of computer programming errors. Analyzing and correcting such errors can be extremely difficult for a number of different reasons. For example, the source of the memory corruption and the manifestation of errors are usually far apart within the software (such as computer program code), making it difficult to correlate cause and effect. Additionally, symptoms appear under exceptional conditions, making it difficult to consistently reproduce the error. Among different types of memory usage errors, a very common and disastrous error is accessing memory through dangling pointers.

Dangling pointers are pointers to already freed memory blocks. Depending upon whether the memory block is in heap memory or stack memory, a dangling pointer is referred to as a heap dangling pointer or a stack dangling pointer. Heap memory allocation and deallocation is explicit, and is accomplished by calling heap memory management functions such as malloc( ) and free( ). Dereferencing a pointer after free( ) has been called for the heap memory block containing the memory pointed to by the pointer causes a heap dangling pointer.

Stack memory allocation and deallocation occurs when computer program control enters or exits from a function, such as a method. A stack dangling pointer occurs if a stack address escapes and becomes stored in a pointer that lives longer than the life of the function or method to which the stack address belongs. Since stack memory allocation is implicit, and the stack memory is reused upon entry into another function or method, detecting stack dangling pointers is relatively difficult.

Furthermore, memory leaks are heap memory blocks to which all pointers are lost, making it impossible for the computer program to free the memory block for subsequent reuse. A leak is characterized by an allocation site and a leak location. The allocation site is the line of a computer program at which the leaked heap memory block is initially allocated. The leak location is the line at which the last pointer to a given heap memory block is lost, resulting in the leak. Identification of the leak location in particular decreases debugging time considerably.

Currently available dangling pointer detection techniques mainly identify heap dangling pointers. Currently available memory leak detection techniques primarily identify the allocation sites for memory leaks, with a disadvantage of not being able to detect the actual leak locations. Such existing techniques to detect dangling pointers and leak locations suffer from other limitations as well. They may not free the heap memory for the purpose of detecting heap dangling pointers. They may be unusable without the source code for software, and/or be incapable of handling general C and C++ programming language applications. The existing approaches may require human intervention to make non-trivial source code modifications. These and other shortcomings of the prior art are addressed by the present invention.

SUMMARY OF THE INVENTION

The present invention detects stack and heap dangling pointers and memory leak locations within software (e.g., computer program code). A method of one embodiment of the invention tracks the software as the software allocates and deallocates memory, to maintain linked lists of pointers referencing the memory, and to maintain statuses of the pointers as invalid or valid. The method further tracks the software as the software writes new addresses within pointers and reads addresses stored within the pointers, to maintain the linked lists of pointers to determine whether the pointers from which the addresses are read are dangling pointers and to detect memory leak locations.

A method of a further embodiment of the invention maintains a balanced binary tree data structure having a number of nodes. Each node represents either a heap record or a stack record. A heap record corresponds to heap memory that has been allocated, and has a linked list of pointers referencing the heap memory. A stack record corresponds to a stack for a thread, where stack frames are allocated within the stack each time the thread enters a function (e.g., a method). The stack record has an array of frame records corresponding to the stack frames. Each frame record has a linked list of pointers referencing the stack frame of the frame record.

The method further maintains a status table data structure of all the pointers within the linked lists of the heap records and the frame records of the stack records. The status table data structure indicates whether each pointer is valid or invalid, a node of the heap record or the stack record having the pointer within a linked list thereof, and, where the node represents a stack record, an index to the frame record within the array of frame records having the pointer within a linked list thereof, and, where the node represents a heap record, the index is zero. The method uses the balanced binary tree data structure and the status table data structure to detect dangling pointers and memory leak locations.

A computerized system of an embodiment of the invention includes a storage to store software. The system further includes a mechanism to modify the software so that dangling pointers and memory leak locations are detectable within the software. This is achieved by inserting additional code within the software to track the software as it allocates and deallocates memory, to maintain linked lists of pointers referencing the memory, and to maintain statuses of the pointers as invalid or valid. This is further achieved by inserting additional code within the software to track the software as it writes new addresses within pointers and reads addresses stored within the pointers, to maintain the linked lists of pointers to determine whether the pointers from which the addresses are read are dangling pointers and to detect memory leak locations.

Embodiments of the invention provide for advantages over the prior art. Unlike the prior art, embodiments of the invention are able to detect all stack and heap dangling pointers that may occur, as well as report the locations at which memory leaks are occurring. Embodiments of the invention are usable without the source code for software, and can be used, for instance, in relation to the object code for the software instead, in contradistinction to the prior art. Embodiments of the invention can handle general C and C++ programming language applications, also in contradistinction to the prior art. Furthermore, unlike the prior art, embodiments of the invention do not require human intervention to make modifications to the software in order to detect stack dangling pointers. Still other advantages, aspects, and embodiments of the invention will become apparent by reading the detailed description that follows, and by referring to the accompanying drawings.

BRIEF DESCRIPTION OF THE DRAWINGS

The foregoing will be apparent from the following more particular description of example embodiments of the invention, as illustrated in the accompanying drawings in which like reference characters refer to the same parts throughout the different views. The drawings are not necessarily to scale, emphasis instead being placed upon illustrating embodiments of the present invention.

The drawings referenced herein form a part of the specification. Features shown in the drawing are meant as illustrative of only some embodiments of the invention, and not of all embodiments of the invention, unless otherwise explicitly indicated, and implications to the contrary are otherwise not to be made.

DETAILED DESCRIPTION OF THE INVENTION

A description of example embodiments of the invention follows.

In the following detailed description of exemplary embodiments of the invention, reference is made to the accompanying drawings that form a part hereof, and in which is shown by way of illustration specific exemplary embodiments in which the invention may be practiced. These embodiments are described in sufficient detail to enable those skilled in the art to practice the invention. Other embodiments may be utilized, and logical, mechanical, and other changes may be made without departing from the spirit or scope of the present invention. The following detailed description is, therefore, not to be taken in a limiting sense, and the scope of the present invention is defined only by the appended claims.

TECHNICAL BACKGROUND

Figure 1A:
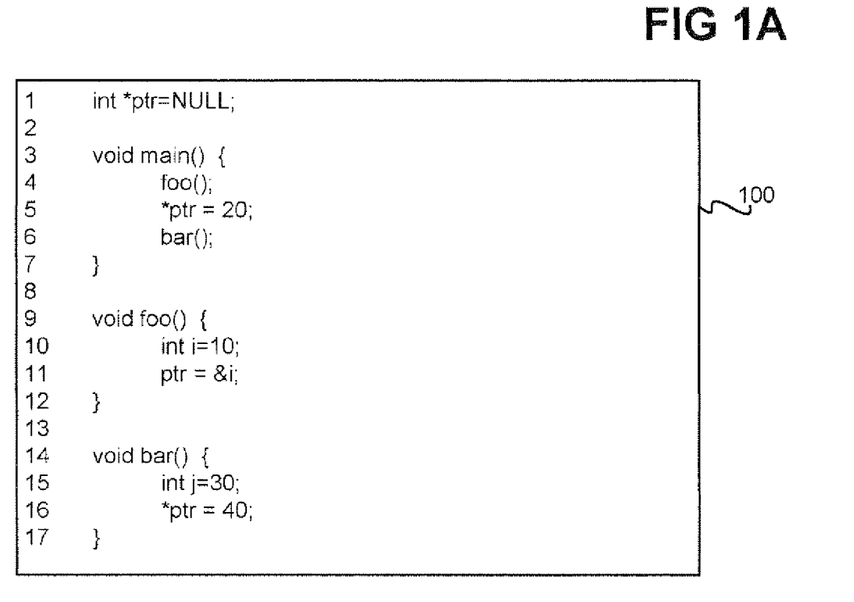
FIG. 1A is a diagram of software, the execution of which results in stack dangling pointers that are detectable by embodiments of the invention.
Figure 1B:
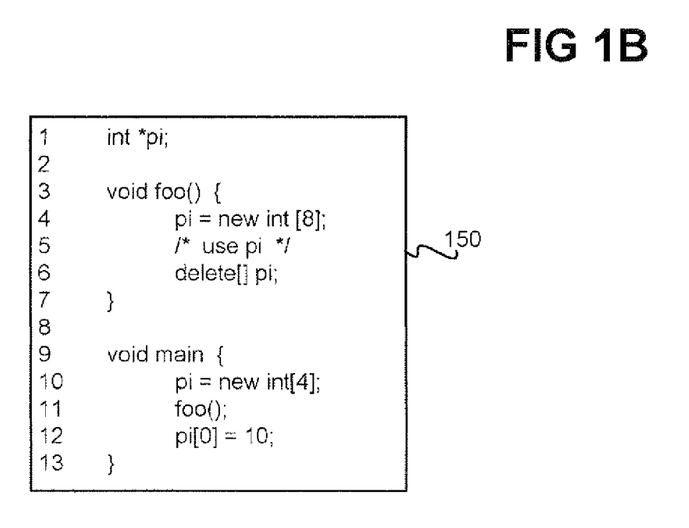
FIG. 1B is a diagram of software, the execution of which results in heap dangling pointers and memory leaks that are detectable by embodiments of the invention.

FIG. 1A shows sample software 100 that yields stack dangling pointers that can be detected by embodiments of the invention, whereas FIG. 1B shows sample software 150 that yields heap dangling pointers and memory leaks that can be detected by embodiments of the invention. As can be appreciated by those of ordinary skill within the art, the software 100 and 150 may be a computer program code. In FIG. 1A, a stack dangling pointer occurs where a stack address escapes and becomes stored in a longer-living pointer. The main( ) function first calls the function foo( ). The terminology function as used herein encompasses what those of ordinary skill within the art consider methods, where the terminology method is refrained from use to avoid confusion with methods of embodiments of the invention. Entry into the function foo( ) results in a stack frame being created to store the local variable i in line 10. The global pointer ptr is then set equal to the address for i in line 11. Upon return from the function foo( ), the function main( ) stores a new value at this address in line 5. However, because the function foo( ) has already been exited, the stack frame that the pointer ptr references has been freed, resulting in line 5 being a stack dangling pointer. Some existing dangling pointer detection techniques may be able to detect this type of stack dangling pointer.

Next, the function main( ) calls the function bar( ). Entry into the function bar( ) also results in a stack frame being created to store the local variable j in line 15. For instance, the same stack frame that was previously allocated upon entry into the function foo( ), and then deallocated upon exit from the function foo( ), may now be allocated to store the local variable j within the function bar( ). As a result, the local variable j has the same address as the global pointer ptr. Therefore, setting the value at the address to which the global pointer ptr points at line 16 also changes the variable for the local variable j. The stack frame that the global pointer ptr references is still a dangling pointer, even though the global pointer ptr now references an address that is encompassed by the stack frame for the function bar( ). Existing stack dangling pointer detection techniques are generally unable to detect this type of stack dangling pointer. That is, such techniques are typically able to only detect stack dangling pointers referencing memory beyond the current stack boundary, and not those pointers that may be improperly referencing memory within currently allocated stack frames, such as that in line 16.

In FIG. 1B, the main( ) function allocates memory space for a global pointer pi in line 10, and then calls the function foo( ). The function foo( ), however, also allocates memory space for the global pointer pi, in line 4. As a result, the memory space previously allocated in line 10 within the function main( ) is leaked, and cannot be used for other purposes until, at best, the program of FIG. 1B has been exited. It is said that the memory leak allocation site is at line 10, insofar this is where the ultimately leaked memory is allocated, but that the memory leak location itself is at line 4, which is where the memory allocated at line 10 is actually leaked. Some existing memory leak detection techniques can detect the location at which leaked memory is originally allocated, at line 10. However, existing memory leak detection techniques generally cannot detect the location at which this memory is actually leaked, at line 4, for instance.

The function foo( ) further users the global pointer pi, and then deletes this pointer in line 6 before exiting. Upon return from the function foo( ), the function main( ), however, then tries to store a value at the address that the pointer pi references, at line 12. This is a heap dangling pointer, since the pointer pi has been previously deleted in the function foo( ) but is still being used. Some existing heap dangling pointer techniques can detect the location of the heap dangling pointer at line 12.

Method for Detecting Dangling Pointers and Memory Leaks

Figure 2:
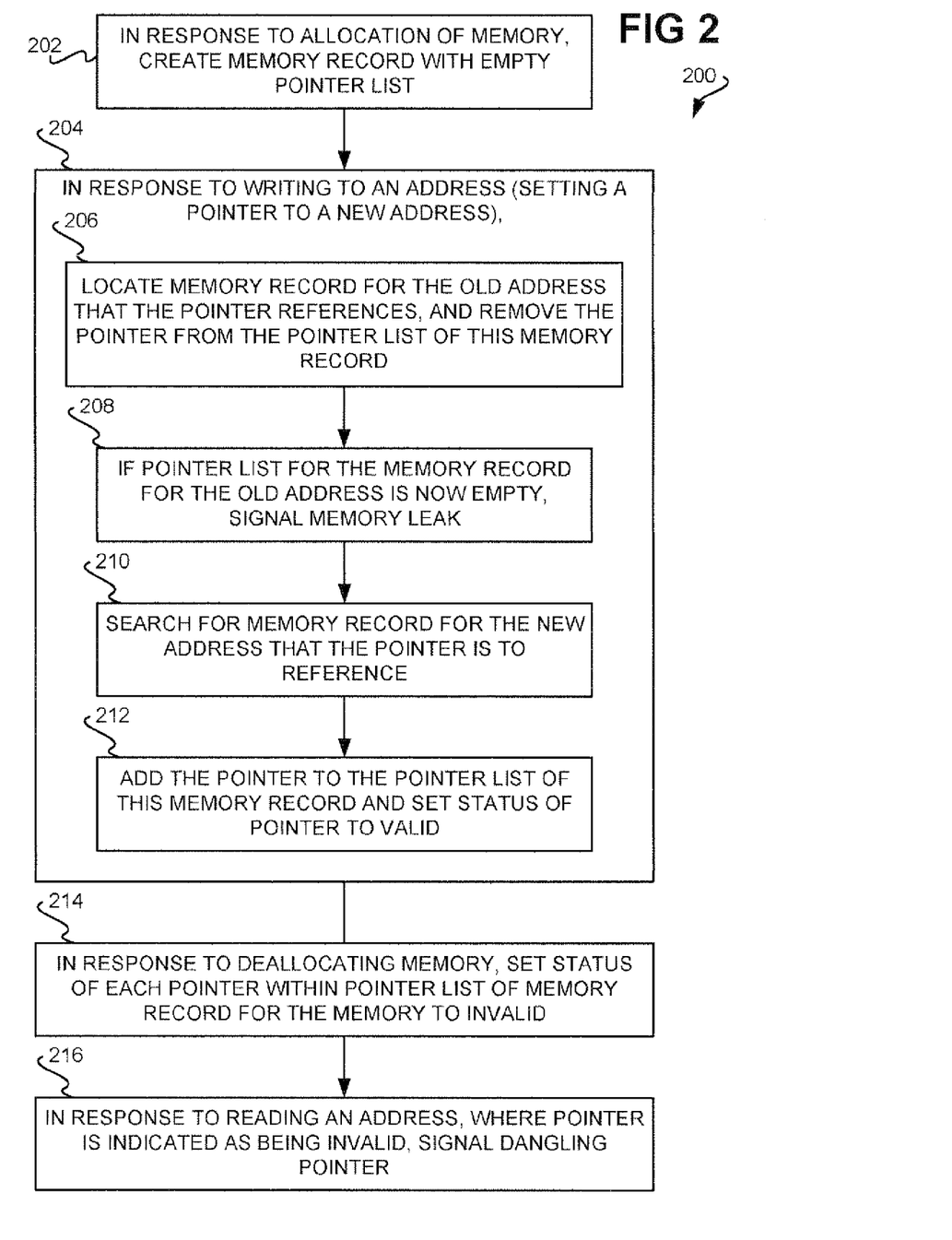
FIG. 2 is a flowchart of a method for detecting stack and heap dangling pointers and memory leak locations, according to an embodiment of the invention.

FIG. 2 shows a method 200 for detecting stack and heap dangling pointers, as well as memory leak locations, within software, according to an embodiment of the invention. The method 200 is performed at runtime of the software, as part of the software in one embodiment. When the software allocates memory, a memory record for the allocated memory is created that has an empty pointer list (202). Memory allocation includes entering a function, resulting in the allocation of a stack frame, as well as allocating heap memory, such as by calling the function malloc( ). A particular implementation of the memory record and the pointer list that can be employed is described later in the detailed description.

Next, in response to the software writing to an address (204), parts 206, 208, 210, and 212 are performed. Writing to an address includes statements of type "p=&m", where p is a pointer and m is a variable, such that &m represents the address of the memory location where m is stored. First, the method 200 searches for a memory record as to the old (i.e., existing) address that the pointer references, and removes the pointer from the pointer list of this memory record (206). (It is noted that the search 206 can be implicitly performed in one embodiment, such that in effect the memory record is located without having to perform a search, as is described later in the detailed description.) For example, prior to execution of the statement "p=&m_new", the software may have executed "p=&m_old". As such, the method 200 searches for the memory record as to the memory location m_old, and removes the pointer p from the list of pointers of this memory record.

If the pointer list of this memory record is now empty, then the method 200 signals a memory leak (208). That is, if there are no longer any pointers that reference the memory in question, then a memory leak has occurred. Thus, if the pointer p is the only pointer in the pointer list of the memory record for the memory location m_old, then the memory at m_old is now a memory leak, and the statement "p=&m_new" is the leak location for this memory.

Next, the method 200 searches for a memory record for the new address that the pointer is to reference (210). In the example, this is the memory record for the address m_new. If the pointer is not already in the pointer list, it is added to the pointer list of this memory record, and the status of the pointer is set to valid (212). For instance, the pointer p is added to the pointer list of the memory record for the address m_new. A separate status table can maintain the status of every pointer as being valid or invalid. A particular implementation of this status table is described later in the detailed description.

Software can also write to an address by calling functions such as memcopy( ), which copies values from a source memory block to a destination memory block. All pointers residing in the source and destination memory blocks can be located by walking the status table for the address range in these memory blocks. Parts 206 and 208 of the method 200 are performed for all pointers found in the destination memory block. Parts 210 and 212 of the method 200 are performed for all pointers found in the source destination block (which will be copied to the destination memory block due to memcopy function call).

In response to the software deallocating memory, the status of each pointer within the pointer list of the memory record for this memory is set to invalid (214). Deallocating memory includes exiting a function to implicitly free a stack frame, as well as calling the function free( ) to explicitly deallocate heap memory. Thus, the method 200 walks through the pointer list of the relevant memory record, and sets the status of each pointer to invalid.

The freed stack frame or heap memory block may contain pointers. Upon freeing the stack frame or heap memory block, these pointers become invalid. Therefore, such pointers are removed from the corresponding pointer lists, and their status should be set to invalid. Instead of searching through the contents of freed memory block to find valid pointers, this method exploits the information of all pointers stored in the status table. Part 214 of the method 200 walks through the status table for the pointers with address with in the address range of freed block. For all valid pointers within that range in the status table, the corresponding pointer list is found using node and index, the pointer is removed from that pointer list, and the status is set to invalid.

Finally, in response to the software reading an address (i.e., dereferencing an address), where the pointer is indicated within the status table as being invalid, the method 200 signals that a dangling pointer has occurred (216). If the pointer is within a list of pointers for a memory record corresponding to a stack frame, then it is a stack dangling pointer. If the pointer is within a list of pointers for a memory record corresponding to heap memory, then it is a heap dangling pointer. For instance, if the index within the pointer status table for the pointer in question is zero, then this means that the pointer resides within a heap record, such that the pointer is a heap dangling pointer. By comparison, if the index within the pointer status pointer for the pointer in question is greater than zero, then this means that the pointer resides within a stack record, such that the pointer is a stack dangling pointer.

The method 200 can be implemented in one embodiment of the invention by code instrumentation. That is, the software in relation to which the method 200 is being performed can be modified with additional code that performs each of the parts of the method 200 that have been described previously. Such modification or supplementing of the software is referred to as code instrumentation, as can be appreciated by those of ordinary skill within the art. Existing and other types of code instrumentation techniques can be used to modify or supplement software to implement the method 200, as can also be appreciated by those of ordinary skill within the art.

Data Structures for Implementing the Method 200 of FIG. 2

Figure 3:
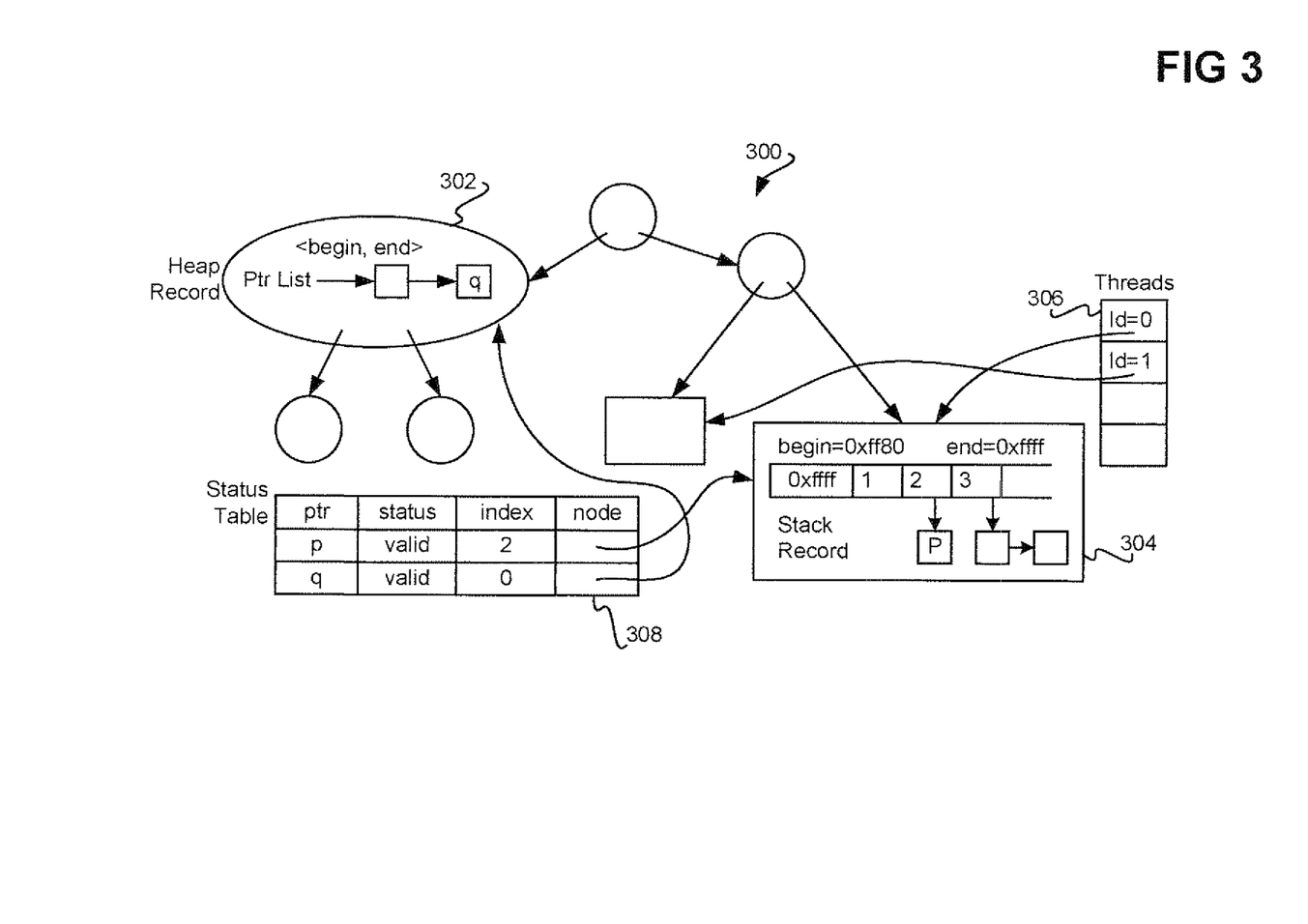
FIG. 3 is a diagram of data structures that can be employed to implement the method of FIG. 2, according to an embodiment of the invention.

FIG. 3 shows data structures for the memory records, the pointer lists, and the status table that have been described in relation to the method 200 of FIG. 2, according to an embodiment of the invention. The data structures of FIG. 3 are maintained within the method 200. In other words, the method 200 uses the data structures of FIG. 3 to detect both heap and stack dangling pointers, as well as memory leak locations.

A balanced binary tree 300 organizes heap records, such as a representative heap record 302 for heap memory resulting from allocation of heap memory, and stack records, such as a representative stack record 304 for the stack for a given thread. The nodes of the binary tree 300 are thus of two types in FIG. 3: oval nodes representing heap records for heap memory blocks, and rectangle nodes representing stack records for stacks, which each encompass the memory associated with all the stack frames of a thread. That is, each running thread is associated with a single stack record for the stack of the thread, where this single stack record encompasses all the stack frames of this stack.

The representative heap record 302 for heap memory includes begin, which is the address at which the heap memory block in question begins, end, which is the address at which this heap memory block ends, and a pointer list, which is the list of pointers pointing to memory locations within this heap memory. The representative stack record 304 for a stack is associated with a thread within an array of running threads 306. As has been noted, each running thread has its own associated stack, and therefore there is a stack record within the balanced binary tree 300 for each thread. That is, since each rectangle node represents the whole stack for a thread, the threads array 306 maps a thread to the stack record for the thread.

The representative stack record 304 for a stack includes an array of frame records, where each frame record corresponds to a stack frame and includes a pointer list and the $sp value after pulling the stack at the time of entering a function in the program. That is, each frame record corresponds to a stack frame, and the $sp value is the address of the stack at which the stack frame begins. The array of frame records itself behaves as a stack. At every function entry by the thread in question, a frame record for the memory allocated for the function (i.e., for the allocated stack frame) is created and added to the end of the array. When a function is completed, since the last called function finishes first in accordance with a last-in, first-out (LIFO) methodology, the last frame record within the array represents the function that has just finished. That frame record is thus removed and the pointer list for that frame record is processed. The $sp values within the first and the last frame records function as the begin and end memory locations for the stack overall.

The status table 308 is a separate data structure that references every pointer within the heap and stack records of the balanced binary tree 300, indicating whether the pointer is valid or invalid, an index of the pointer within the relevant array of frame records in the case where the pointer is within a pointer list of a stack record, and the node within which the pointer is present within a pointer list thereof (Where the pointer is within a pointer list of a heap record, the index for the pointer within the status table 308 is set to a zero value, which indicates that the pointer is within a heap record.) The index and the node for a pointer are updated when the status of the pointer is being updated, such as in parts 212 and 214 of the method 200 of FIG. 2.

Thus, the data structures that can be used to implement the method 200 of FIG. 2 include the following. First, there is a balanced binary tree 300 of the heap and stack records for allocated heap memory and stack memory. As to the former, there is a heap record for each block of heap memory that is allocated, such as the representative heap record 302. As to the latter, there is a stack record for the stack of each currently running thread, such as the representative stack record 304. Second, within each stack record, there is an array of frame records corresponding to entries of functions by the thread of the stack record in question. Third, there is an array 306 tracks the currently running threads. Fourth, there is a status table 308 that tracks the validity and invalidity of all the pointers within the pointer lists of the heap and stack records of the balanced binary tree 300.

As such, the memory records that have been referred to in the method 200 of FIG. 2 include two different types of records as has been described in relation to the data structures of FIG. 3. First, memory records for heap memory as described in relation to the method 200 are the heap records of the balanced binary tree 300, such as the representative heap record 302. As heap memory is allocated and deallocated, corresponding heap records are added to and removed from the balanced binary tree 300. Second, memory records for stack frames as described in relation to the method 200 are the frame records within the array of frame records of the stack records for the threads referenced within the array 306. When a given thread is initialized, it is added to the array 306, and a stack record, such as the representative stack record 304, is created for it within the balanced binary tree 300. Thereafter, as functions are entered and exited by this thread, frame records are correspondingly added to and removed from the array of frame records for this stack record. When a given thread is terminated, its stack record is removed, and the thread is removed from the array 306.

The combination of a balanced binary tree 300 and a stack record for the stack of each thread enables fast search and manipulation of the data within the method 200 of FIG. 2. For example, the search performed in part 206 of the method 200 is eliminated (i.e., it is performed implicitly). This is because the status table 308 stores a reference to the record for the old address that a pointer references. Therefore, the heap and stack records of the balanced binary tree 300 do not have to be traversed to locate this record. Rather, "searching" is implicitly performed by simply looking up the pointer in question within the status table 308. Likewise, in the case of a stack record, the status table 308 denotes within which frame record of which stack record a pointer is located. That is, the status table 308 indicates the frame record having a linked list of pointers in which a given pointer is located. As such, "searching" is still implicitly performed by just looking up the pointer in question within the status table 308.

Furthermore, since the $sp values either monotonically increase or decrease depending on the design of the stack, the $sp values are always in sorted order. As a result, a relatively fast binary search can be performed on the stack record for a thread to locate the relevant frame record for the new address that a pointer is to reference—i.e., to perform part 210 of the method 200 of FIG. 2. The first frame record within a stack record for a thread has the address where the stack for the thread starts, as the $sp value of this frame record. This frame record thus operates as a sentinel value while doing binary search within the frame records. The stack records themselves, and hence the arrays of frame records, are accessible through the thread array 306, resulting in this approach being very economical for creating a frame record for function entry and exit, in that an entry within the array of frame records just has to be added for function entry. This is advantageous, since function entry and exit usually occur more frequently than allocation and deallocation of heap memory do.

The search of part 210 of the method 200 of FIG. 2 is therefore performed in relation to the heap and stack records of the balanced binary tree 300. The search of part 210 is the search for the heap or stack record corresponding to the memory location m_new, in relation to the address write command "p=&m_new". It is guaranteed that heap memory blocks are non-overlapping, and as well as that the stacks for different threads are non-overlapping. Therefore, the range specified by <begin, end> for each node of the balanced binary tree 300 is unique. Further, for each stack record, all frame records are guaranteed to be sorted according to their $sp values.

Figure 4:
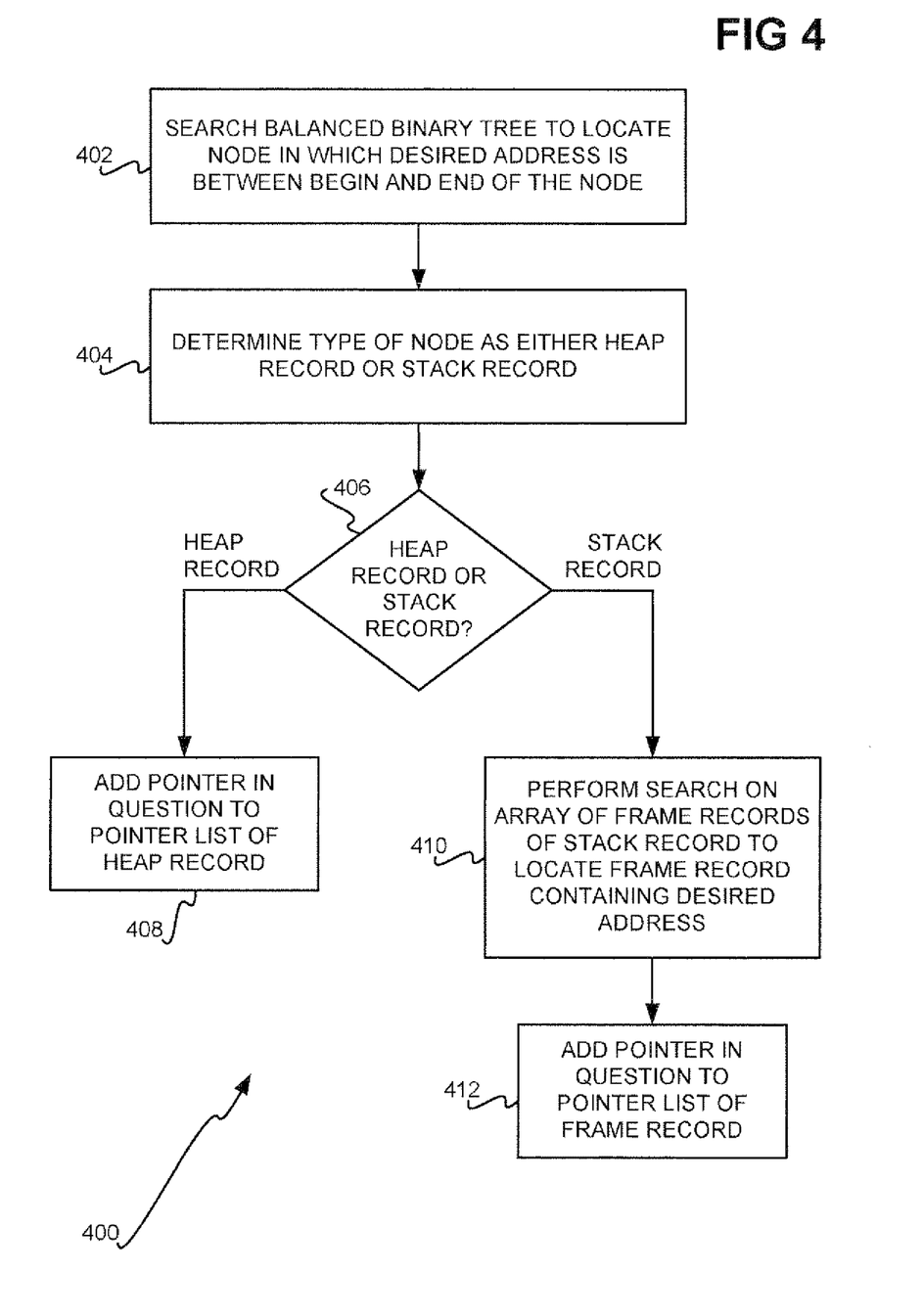
FIG. 4 is a flowchart of a method for locating a memory record within a balanced binary tree that corresponds to a given memory address, according to an embodiment of the invention.

FIG. 4 shows a method 400 for implementing parts 210 and 212 of the method 200 of FIG. 2 in relation to the balanced binary tree 300 of FIG. 3, according to an embodiment of the invention. First, within the balanced binary tree 300, a search is done based on the integer range <begin, end> (instead of a single integer as in typical binary trees), to locate a node where the given address m_new is between begin and end (402). The type of node is determined (404), as either a heap record (i.e., an oval node) or a stack record (i.e., a rectangle node). If the node is a heap record (406), the search is completed, and if the pointer list within the node does not have pointer p, it is altered to include the pointer p (408). If the node is a stack record (406), a binary search is then performed on the array of frame records to find the frame record containing the address m_new (410), and if the pointer list for this frame record does not have pointer p, it is altered to include the pointer p (412).

SYSTEM AND CONCLUSION

Figure 5:
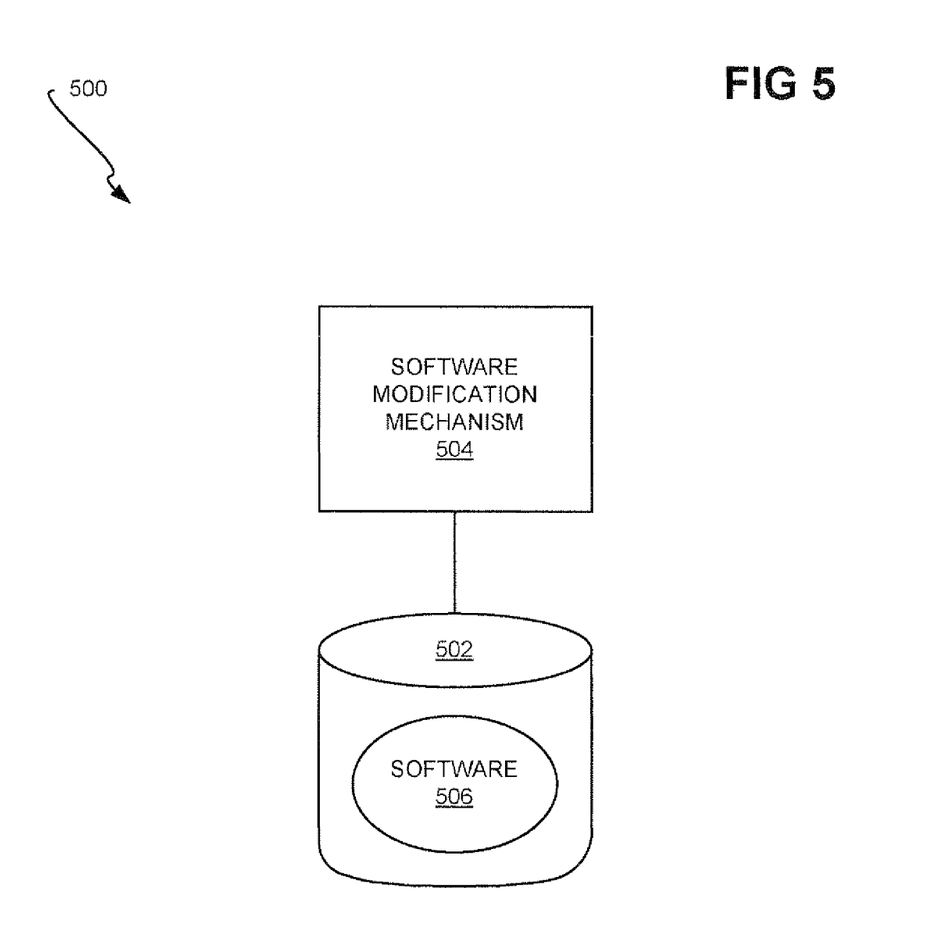
FIG. 5 is a diagram of a system, according to an embodiment of the invention.

FIG. 5 shows a rudimentary computerized system 500, according to an embodiment of the invention. The system 500 includes a storage 502, and a software modification mechanism 504. As can be appreciated by those of ordinary skill within the art, the system 500 can include other components, in addition to those depicted in FIG. 5. The storage 502 may be non-volatile storage, such as one or more hard disk drives, and/or volatile storage, such as random-access memory. The storage 502 stores software 506 that is modified so that at runtime execution of the software 506 results in detection of stack and heap dangling pointers and memory leak locations.

The software modification mechanism 504 may be implemented in hardware, software, or a combination of hardware and software. The mechanism 504 modifies the software 506 so that the method 200 of FIG. 2 is performed. As a result, execution of the software 506 at runtime results in detection of dangling pointers and memory leak locations. Where the source code for the software 506 is available, the mechanism 504 may be implemented within a compiler that compiles the code, such that the source code is modified during compilation, as can be appreciated by those of ordinary skill within the art. By comparison, where just the object code for the software 506 is available, the mechanism 506 may be a separate instrumentation engine that modifies this object code, as can also be appreciated by those of ordinary skill within the art.

At least some embodiments of the invention can thus provide for source code instrumentation, or modification, as well as object code instrumentation, or modification. As such, embodiments of the invention provide flexibility to choose between the two depending need. The runtime code added to the software 506 is identical regardless of whether the source code or the object code is modified. Therefore, in one embodiment, a heterogeneous approach can be employed, where source code is modified for some portions of the software 506, and object code is modified for other portions of the software 506. For example, where applications are built by linking with system and third-party object libraries, source code may be available for the original portions of the software 506, but just object code may be available for the linked libraries.

Furthermore, general C and C++ computer programming language applications can be handled, so that the user does not have to perform any modification within the source code him or herself. Such embodiments also do not change the semantics of the computer programming languages being used, nor do they restrict the use of any features of the languages. Thus, though embodiments of the invention have been described herein relation to the C and C++ computer program languages, other embodiments are at least substantially independent of any specific language features, and therefore are applicable to any computer programming language that does not employ garbage collection, as can be appreciated by those of ordinary skill within the art.

It is noted that, although specific embodiments have been illustrated and described herein, it will be appreciated by those of ordinary skill in the art that any arrangement calculated to achieve the same purpose may be substituted for the specific embodiments shown. This application is thus intended to cover any adaptations or variations of embodiments of the present invention. For instance, various types of inter- and intra-procedural data and control flow analysis can be performed at both source code and object code level to eliminate redundant instrumentations. For example, if the address of the same stack variable is being stored twice in the same pointer without the pointer being modified in between, then the address write instrumentation for the second assignment is unnecessary. Similarly, if a pointer is dereferenced twice without the pointer being modified and without any function call in between, the checks for the second dereference can be removed.

As another variation, the index within the status table to can be initialized to −1, to identify uninitialized pointers in addition to dangling pointers. As such, if the status is invalid, and the index is zero, then the pointer in question is a heap dangling pointer. If the index is positive, then the pointer is a stack dangling pointer. Otherwise (i.e., the index is −1 still), then the pointer is uninitialized. As a third variation, control and data flow analysis can be achieved to locate pointer copy sequences such as ptr1=ptr2. In identifying such cases, if the contents within the status table for ptr2 are copied to the status table entry for ptr1, adding ptr1 to the pointer list is performed if the status for ptr2 is valid. This variation makes the resulting analysis slightly more powerful. Therefore, it is manifestly intended that this invention be limited only by the claims and equivalents thereof.

While this invention has been particularly shown and described with references to example embodiments thereof, it will be understood by those skilled in the art that various changes in form and details may be made therein without departing from the scope of the invention encompassed by the appended claims.

What is claimed is:

1. A method for detecting at least one of a dangling pointer and a memory leak location within a software, comprising:
    at runtime of the software:
        first tracking, by a digital processor, the software as the software performs at least one of allocating and deallocating memory, said first tracking including maintaining a linked list of at least one pointer and in a memory record specific to pointers of the linked list maintaining explicit indications of status of each pointer in the linked list, the linked list including a reference to the memory that has been allocated or deallocated, and said first tracking maintaining in the memory record explicit indications of statuses of the pointers in the linked list including the memory record explicitly indicating status of the at least one pointer, as invalid or valid;
        further tracking, by the digital processor, the software as the software performs at least one of writing a new address within a pointer of the linked list and reading an address stored within a pointer of the linked list, said further tracking maintaining the linked list and performing at least one of (i) determining whether the pointer from which the address has been read is a dangling pointer and (ii) detecting a memory leak location based on the writing of the new address; and
        displaying to a user indications of any determined dangling pointer and any detected memory leak location,
        wherein the memory record comprises a pointer status table that includes the statuses of the pointers and the status of the at least one pointer as invalid or valid.

2. The method of claim 1, wherein the first tracking the software as the software performs at least one of allocating and deallocating memory comprises one or more of:
    when the software enters a function, creating a record for a current stack frame, the record including a linked list of at least one pointer, the linked list including a reference to the current stack frame; and,
    when the software allocates heap memory, creating a record for the heap memory, the record including a linked list of at least one pointer, the linked list including a reference to the heap memory that has been allocated.

3. The method of claim 2, wherein first tracking the software as the software performs at least one of allocating and deallocating memory further comprises one or more of:

prior to the software deallocating the heap memory, setting a status of each pointer of the linked list of the record for the heap memory that is to be deallocated to invalid; and prior to the software exiting the function, setting a status of each pointer of the linked list of the record for the current stack frame to invalid.

4. The method of claim 1, wherein the further tracking the software as the software performs at least one of writing a new address within a pointer of the linked list and reading an address stored within a pointer of the linked list comprises:

prior to the software writing a given new address within a subject pointer, in response to determining that an existing address stored within the subject pointer is referenced within a first record corresponding to memory encompassing the existing address, deleting the subject pointer from a linked list of pointers of the first record;

where the linked list of pointers of the first record from which the subject pointer was deleted is now empty, signaling a memory leak and reporting a line of the software at which the software writes the given new address within the subject pointer as a location of the memory leak; and, in response to determining that the given new address to be stored within the subject pointer is referenced within a second record corresponding to memory encompassing the given new address, adding the subject pointer to a linked list of at least one pointer of the second record and setting a status of the subject pointer as valid.

5. The method of claim 4, wherein the further tracking the software as the software performs at least one of writing a new address within a pointer of the linked list and reading an address stored within a pointer of the linked list further comprises:

prior to the software reading an address stored within a respective pointer, in response to determining that a status of the respective pointer is invalid, reporting that the respective pointer is a dangling pointer.

6. The method of claim 5, wherein the respective pointer is reported as a stack dangling pointer where an index for the respective pointer within the pointer status table is greater than zero, and is reported as a heap dangling pointer where the index is equal to zero.

7. A method as claimed in claim 1, wherein the further tracking prior to the software reading an address stored within a respective pointer in the linked list, in response to determining that a status of the respective pointer is invalid, reporting that the respective pointer is a dangling pointer.

8. A method as claimed in claim 7, wherein the pointer status table holds an index value of the respective pointer, where the index value for the respective pointer is greater than zero, the further tracking reporting that the respective pointer is a stack dangling pointer, and where the index value for the respective pointer is equal to zero, the further tracking reporting that the respective pointer is a heap dangling pointer.

9. A computer system comprising:
a processor; a storage storing software;
a mechanism to modify the software so that at least one of a dangling pointer and a memory leak location is detectable within the software at runtime, by:

inserting first additional code within the software, the first additional code configured to track the software as the software performs at least one of allocating and deallocating memory, and the first additional code configured to maintain a linked list of at least one pointer and to maintain a memory record specific to pointers of the linked list, explicitly indicating status of each pointer in the linked list, the linked list including a reference to the memory that has been allocated or deallocated, wherein the first additional code maintains in the memory record explicit indications of statuses of the pointers in the linked list, including explicit memory record indications of status of the at least one pointer, as invalid or valid;

inserting second additional code within the software, the second additional code configured to track the software as the software performs at least one of writing a new address within a pointer of the linked list and reading an address stored within a pointer of the linked list, the second additional code configured to further maintain the linked list and perform at least one of (i) determining whether the pointer from which the address has been read is a dangling pointer and (ii) detecting a memory leak location based on the writing of the new address; and a display providing an output of processor execution of the software as modified, the output including indications of any determined dangling pointer and any detected memory leak location, wherein the memory record comprises a pointer status table that includes the statuses of the pointers and the status of the at least one pointer as invalid or valid.

10. The system of claim 9, wherein the first additional code inserted within the software to track the software as the software performs at least one of allocating and deallocating memory is configured to perform one or more of:

when the software enters a function, creating a record for a current stack frame, the record including a linked list of at least one pointer, the linked list including a reference to the current stack frame; and, when the software allocates heap memory, creating a record for the heap memory, the record including a linked list of at least one pointer, the linked list including a reference to the heap memory that has been allocated.

11. The system of claim 10, wherein the first additional code inserted within the software to track the software as the software performs at least one of allocating and deallocating memory further performs one or more of:

prior to the software deallocating the heap memory, setting a status of each pointer of the linked list of the record for the heap memory that is to be deallocated to invalid; and, prior to the software exiting the function, set a status of each pointer of the linked list of the record for the current stack frame to invalid.

12. The system of claim 9, wherein the second additional code inserted within the software to track the software as the software performs at least one of writing a new address within a pointer of the linked list and reading an address stored within a pointer of the linked list performs:

prior to the software writing a given new address within a subject pointer, in response to determining that an existing address stored within the subject pointer is referenced within a first record corresponding to memory encompassing the existing address, deleting the subject pointer from a linked list of pointers of the first record;

where the linked list of pointers of the first record from which the subject pointer was deleted is now empty, signaling a memory leak and reporting a line of the software at which the software writes the given new address within the subject pointer as a location of the memory leak; and in response to determining that the given new address to be stored within the subject pointer is referenced within a second record corresponding to memory encompassing the given new address, adding the subject pointer to a linked list of at least one pointer of the second record and setting a status of the subject pointer as valid.

13. The system of claim 12, wherein the second additional code inserted within the software to track the software as the software performs at least one of writing a new address within a pointer of the linked list and reading an address stored within a pointer of the linked list further performs:

prior to the software reading an address stored within a respective pointer, in response to determining that a status of the respective pointer is invalid, reporting that the respective pointer is a dangling pointer.

14. The system of claim 13, wherein the pointer status table holds an index value of the respective pointer, where the index value for the respective pointer is greater than zero, the second additional code is configured to further report that the respective pointer is a stack dangling pointer, and where the index value for the respective pointer is equal to zero, the second additional code is configured to further report that the respective pointer is a heap dangling pointer.

* * * * *